United States Patent [19]

Price

[11] Patent Number: 4,659,919
[45] Date of Patent: Apr. 21, 1987

[54] OPTICAL SENSING CIRCUIT FOR AUDIO ACTIVATION OF TOYS

[76] Inventor: William E. Price, 402 E. Roger Rd., Tucson, Ariz. 85705

[21] Appl. No.: 830,482

[22] Filed: Feb. 14, 1986

Related U.S. Application Data

[63] Continuation of Ser. No. 479,574, Mar. 28, 1983, abandoned.

[51] Int. Cl.⁴ .......................... G01V 9/04; H01J 40/14
[52] U.S. Cl. ................... 250/209; 250/214 R; 250/221; 340/555; 446/297; 446/397
[58] Field of Search .......... 250/206, 208, 209, 214 R, 250/214 SW, 221; 307/117; 340/555–557, 567, 573; 446/270, 297, 397, 298–302

[56] References Cited

U.S. PATENT DOCUMENTS

| | | | |
|---|---|---|---|
| 3,150,461 | 9/1964 | Grist | 46/232 |
| 3,191,048 | 6/1965 | Cowen | 250/251 |
| 3,274,729 | 9/1966 | Refabert | 46/232 |
| 3,343,281 | 9/1967 | Greer, Jr. | 35/35 |
| 3,443,338 | 5/1969 | Collins | 46/227 |
| 3,444,384 | 5/1969 | Horeczky | 250/221 |
| 3,631,434 | 12/1971 | Schwartz | 250/221 X |
| 3,702,937 | 11/1972 | Browning | 250/210 |
| 3,863,239 | 1/1975 | Campman | 250/578 |
| 4,085,411 | 4/1978 | Genesi | 354/51 |
| 4,185,192 | 1/1980 | Wagner | 250/221 |
| 4,199,753 | 4/1980 | Gontowski, Jr. | 340/555 |
| 4,221,927 | 9/1980 | Dankman et al. | 179/1 |
| 4,317,992 | 3/1982 | Stauffer | 250/221 |
| 4,403,142 | 9/1983 | Kondo | 340/555 |

Primary Examiner—Edward P. Westin
Attorney, Agent, or Firm—Cahill, Sutton & Thomas

[57] ABSTRACT

A noise-generating toy includes first and second optical sensors to detect the intensity of light in first and second optical fields, respectively. The sensor signals serve as inputs to a comparator which provides as an output a differential signal indicative of the difference between the sensor outputs. The comparator output drives an oscillator which generates audio signals in response to the differential in the intensity of light. The oscillator drives one or more speakers with the audio signals, and the speakers use the audio signals to produce audible sound or noise.

25 Claims, 4 Drawing Figures

OPTICAL SENSING CIRCUIT FOR AUDIO ACTIVATION OF TOYS

This is a continuation of Ser. No. 479,574, filed Mar. 28, 1983, now abandoned.

BACKGROUND OF THE INVENTION

1. Field of the Invention

This invention relates generally to noise generating toys, and more particularly, to an optical differential sensing circuit for actuating a noise generator in a toy to emit at least one, and preferably plural, audible sounds.

2. Description of the Prior Art

Children have in the past exhibited a desire to play with toys that mimic behavior typical of a real-life human or animal. The advancement of the electronics industry has made it possible for toys to more realistically portray the desired traits. In particular, toys which are capable of producing audible sounds upon activation by the user have in the past proven to be very successful.

Initially, noise-generating toys were manually activated by a user depressing various portions of the toy to force air through whistle or reed-type mechanisms. However, these manually actuated mechanisms failed to closely mimic or emit sounds which were typical of the human or animal which the toy portrayed. Further, this type of prior art had to be directly activated by the user and could not be sustained over any length of time.

Electronic circuits were adapted to electrically control movement of toys and the audible sounds emitted therefrom. For example, U.S. Pat. No. 3,443,338 to Collins discloses a toy which simultaneously mimics a dog's physical movements while emitting an audible sound which imitates a dog's bark. The mechanism for eliciting the simulated dog movements and barks is directly activated by a switch controlled by the user.

The development of the photo-cell enabled manufacturers to provide toys which could be activated remotely. For example, U.S. Pat. No. 3,274,729 to Refabert discloses a doll having a photo-cell actuated sounding means. In particular, the Refabert patent teaches a photo conductive cell which is mounted in such a manner on the doll so that it can be irradiated by light, such as on the doll's chest or in one of the doll's eyes. A small electric motor is energized under control of the intensity of the irradiation of the photo conductive cell. Means for producing an audible signal is operated by the small electric motor. The means for producing the audible sound comprises at least one bellow and reed, which mechanically create the audible sound.

As electrical technology has advanced, the need existed to provide remotely actuated toys which elicit a plurality of audible sounds without the need for providing plural mechanical bellows and reed combinations. Recently, the tendency has been to provide verbally actuated toys. For example, U.S. Pat. No. 4,221,927 to Dankman et al discloses a voice responsive talking toy. The Dankman patent discloses a toy which, in response to a complex sound such as human speech, generates a train of audio pulses. The pulses generated by the Dankman toy are psuedo-random with respect to frequency composition and duration. Such toys require fairly complex and expensive electrical circuits.

The need still exists to provide a toy which is remotely or automatically actuated to emit audible sounds and which is efficiently and inexpensively manufactured.

SUMMARY OF THE INVENTION

Accordingly, it is an object of the present invention to provide an improved remotely activated circuit for causing audio signals to be emitted from a toy.

Another object of the invention is to provide such a circuit which is inexpensive to manufacture, requires little power to operate, and generates random audio signals upon activation.

Another object of the invention is to provide such a circuit which is activated by a determined light differential between two fields of radiation.

Another object of the invention is to provide such a circuit which generates and emits sounds which are typical of the character which the toy portrays, such as a human child, an animal, or a television character.

The above and other objects are achieved by an optical sensing circuit for activating an audio generator, comprising optical sensors for sensing the insensity of light in at least one field of radiation. A comparator circuit is coupled to the optical sensors and triggers a pulse at a determined differential level in the intensity of light between the optical sensors. An oscillating circuit is reactively coupled to the comparator circuit and generates audio signals in response to the triggered pulse at the differential level determined by the comparator means. A speaker is coupled to the oscillator circuit for emitting the audio signals.

DESCRIPTION OF THE PREFERRED EMBODIMENT

Figure 1:
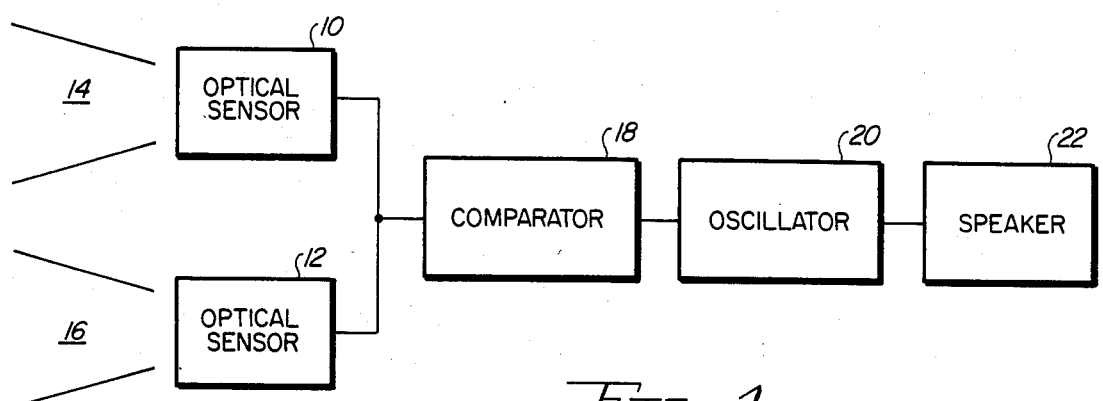
FIG. 1 comprises a block diagram of the inventive optical sensing circuit.

Referring to the block diagram of FIG. 1, it is seen that plural optical sensing circuits 10, 12 sense the intensity of light in fields of radiation 14, 16. The fields of radiation 14, 16 may constitute a single volume, with the optical sensors 10, 12 simply focused in separate areas of the volume. The optical sensors 10, 12 are coupled together and serve as the input to a comparator circuit 18. The comparator circuit 18 monitors a differential in the intensity of the light between the fields of radiation 14, 16 as detected by the optical sensing circuits 10, 12. At a determined differential level, the comparator circuit 18 triggers a detection pulse. The triggered detection pulse is input to an oscillator circuit 20 which is coupled to the comparator circuit 18. The oscillator circuit 20 reacts to the triggered pulse from the comparator circuit and generates random audio signals. The random audio signals are then input to a speaker circuit 22, where they are emitted.

Figure 2:
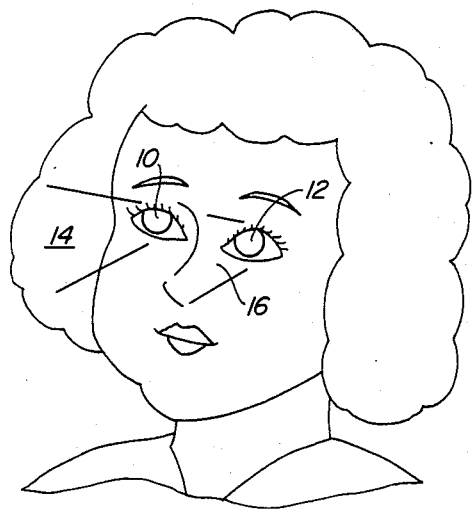
FIG. 2 is a plan view of the optical sensing circuit adapted for use in a toy in the form of a small doll.

Referring additionally to FIG. 2, the above described circuit is shown adapted for use in a toy doll which portrays a small child. The optical sensors 10, 12 are positioned in the eyes of the doll, and the fields of radiation 14, 16 are the areas generally in front thereof. The comparator circuit 18 and oscillator circuit 20 should be fabricated of low power IC's so that the circuits 18, 20 can be positioned within the body of the doll and can operate for long periods of time powered by standard batteries. Generally, CMOS type IC's are preferred. The speaker circuit 22 can be positioned beneath clothing or within the mouth of the doll.

In the configuration shown in FIG. 2, if one eye of the doll is closed, or if an object is passed through either or both of the fields of radiation 14, 16, a differential in the intensity of light is detected by the optical sensing circuits 10, 12. The comparator circuit 18 monitors the level of the differential, and at a determined differential triggers a detection pulse. The detection pulse in turn is input to the oscillator circuit 20. The oscillator circuit 20 reacts to the detection pulse and generates random audio signals which are input to the speaker circuit 22. The speaker circuit 22 emits audible sounds which if desired, can be programmed to sound like a small child.

Figure 3:
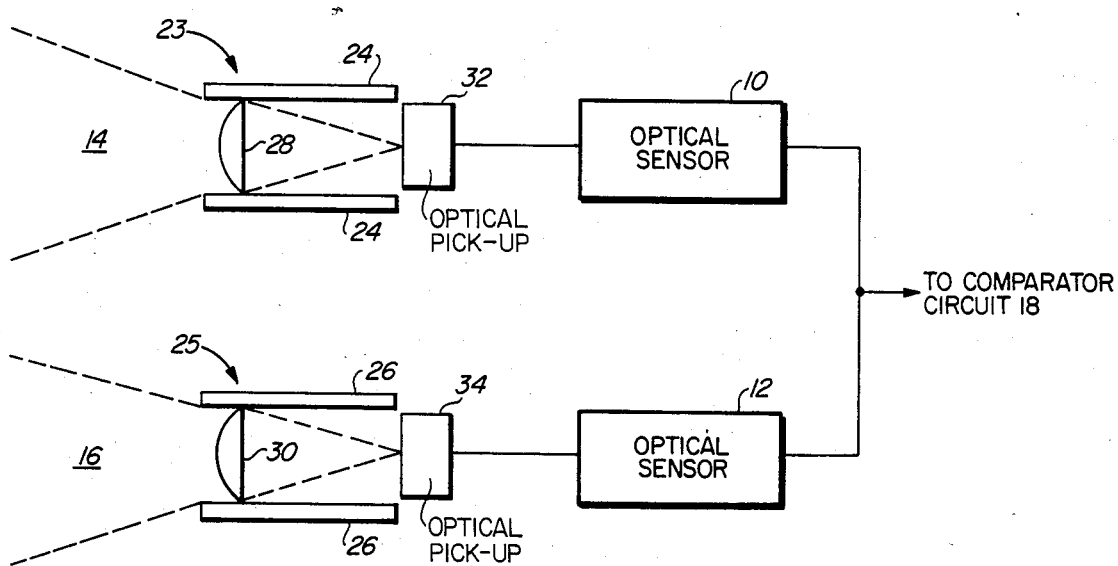
FIG. 3 is a plan view of means for focusing and controlling the light from a plurality of fields onto optical sensors.

Shown in FIG. 3 are first and second light amplifying apparatuses 23, 25. Each apparatus 23, 25 comprises a cylindrical channel 24, 26 which holds in place a cylindrical lens 28, 30. Each lens 28, 30 amplifies, and intensifies, the level of radiation within the fields 14, 16 and focuses the radiation upon pick up 32, 34. Thus, even small changes in the level of radiation within the fields 14, 16 can be detected by the pickups 32, 34. The pickups 32, 34 are coupled to the optical sensing circuits 10, 12 respectively.

Figure 4:
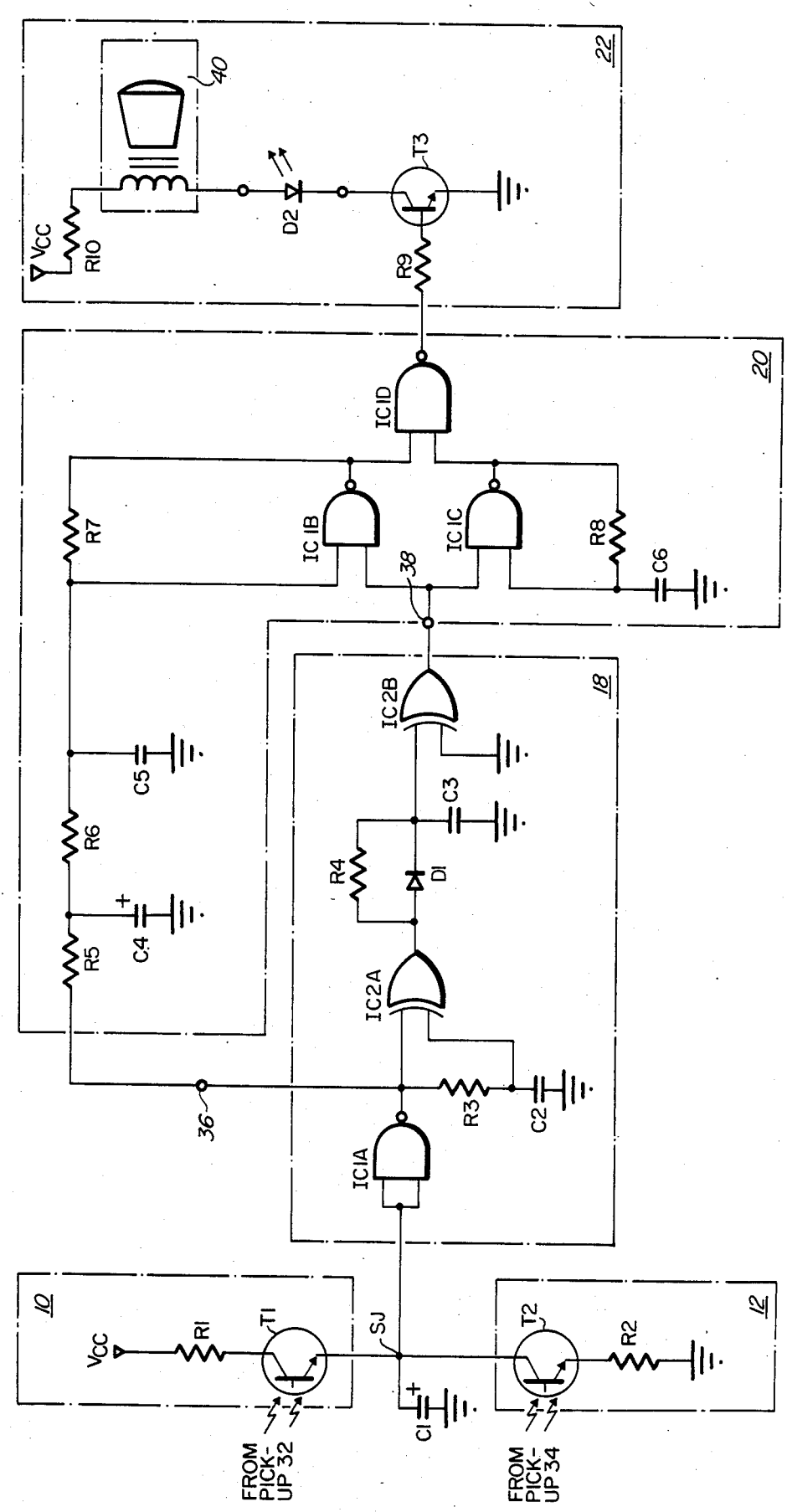
FIG. 4 is a detailed diagram of a preferred embodiment of the circuit.

Referring to FIG. 4, a detailed circuit is shown as an exemplative means for carrying out the function of the block diagram of FIG. 1. The first optical sensing circuit 10 comprises a photo conductive transistor T1 having its base responsively coupled to the first amplifying apparatus 23 and pickup 32. The collector of transistor T1 is coupled to Vcc through a resistor R1. The emitter of transistor T1 is coupled to a summing junction SJ, the positive side of a capacitor C1, and to the second optical sensing circuit 12 at the collector of a second photo-conductive transistor T2. Transistor T2 is responsively coupled to the second amplifying apparatus 25 at pickup 34. The emitter of transistor T2 is coupled to ground through resistor R2. In its preferred embodiment, it is found that with Vcc equal to +9 V, resistors R1 and R2 have values of 1K ohm and capacitor C1 has a value equal to 0.01 ufd.

The summing junction SJ creates a voltage that is responsive to the relative intensities of the two fields of radiation 14, 16, and serves as the input to the comparator circuit 18. The summing junction SJ is coupled to both inputs of a NAND gate IC1A (type 4093) constituting a Schmitt-trigger circuit. In operation, it is assumed that transistor T1 has a higher gain than transistor T2. As a result, with a light background, the voltage level at the summing junction SJ will be driven high. As a dark object passes through field 14, the light amplified by the apparatus 24 is reduced, causing transistor T1 to lose base drive. As a result, transistor T2, which still receives light, drives the summing junction SJ to a low voltage. When the dark object passes out of the field 14 into field 16, transistor T1 again receives base drive while transistor T2 loses base drive, thus causing the summing junction SJ to return to a high voltage. A similar, but reversed, operation occurs when a light object passes through a dark background.

The output of NAND gate IC1A will switch high when the summing junction SJ passes from a logical 1 state to a logical zero state. Thus, as the dark object passes through the lighted field 14, the summing junction SJ drops to a logical 0 and causes the output of NAND gate IC1A to switch to logical 1. The output of NAND gate IC1A is coupled to a first input of exclusive of (XOR) gate IC2A (type 4070) and to the second input of XOR gate IC2A through a resistor R3. The second input of XOR gate IC2A is also coupled to ground through capacitor C2. In its preferred form, resistor R3 has a value of 100K ohms and capacitor C2 has a value of 0.1 ufd.

As the output of the NAND gate IC1A switches to logical 1, the output of XOR gate IC2A switches to logical 1, and the second input to XOR gate IC2A charges in accordance with time constant R3C2 to a logical 1. When the second input to XOR gate IC2A reaches logical 1, the output to XOR gate IC2A returns to logical 0, thereby ending a short positive pulse. In its preferred embodiment, the triggered positive pulse acts as a transition detector and has a duration of approximately 7 msec.

The output of XOR gate IC2A is coupled to a first input of a second XOR gate IC2B (type 4070) through the parallel combination of a diode D1 and a resistor R4. The first input of XOR gate IC2B is also coupled to ground through capacitor C3. In the preferred form, diode D1 is a type 1N914 diode, resistor R4, has a value of 1 Meg ohm, and capacitor C3 has a value of 1 ufd. The second input of the XOR gate IC2B is coupled to ground. When the transition detector IC2A emits the triggered positive pulse, the first input to XOR gate IC2B initially switches to a positive voltage and then slowly discharges to logical zero. The total decay time is approximately 2.5 seconds. As the first input to the XOR gate IC2B switches to logical 1, the output of the XOR gate IC2B also switches to logical 1. The output of the XOR gate IC2B remains at logical 1 voltage until the first input decays past a transition level between logical 1 and logical 0, which occurs at approximate 650 msec after initially switching to logical 1. As such, XOR gate IC2B serves to stretch out the initial triggered 7 msec positive pulse from the transition detector to a longer 650 msec positive pulse.

The output of the NAND gate IC1A, in addition to representing a trigger pulse, serves as one of the inputs to the oscillator circuit 20 at terminal 36. The output of the XOR gate IC2B serves as a second input to the oscillating circuit 20 at terminal 38. As the output of NAND gate IC1A switches to a logical 1, the input terminal 36 to the oscillator circuit 20 simultaneously switches to logical 1. A capacitor C4 is thus charged through a resistor R5. In a preferred form, R5 has a value of 27K ohms and C4 has a value of 4.7 ufd. The positive side of the capacitor C4 is coupled to another capacitor C5 through a resistor R6. The negative sides of capacitor C4 and capacitor C5 are coupled to ground. The preferred value of R6 is 47K ohm and the preferred value of C5 is 0.022 uf. The positive side of capacitor C6 is coupled to a first input of a NAND gate IC1B. The output of NAND gate IC1B is coupled to the first input through a feedback resistor R7. Feedback resistor R7 has a value of 48K ohms. The output of XOR gate IC2B at terminal 38 is coupled to the second input of NAND gate IC1B and to a first input of another NAND gate IC1C (type 4093). The second input of NAND gate IC1C is coupled to ground through capacitor C6 and to the output of NAND gate IC1C through a feedback resistor R8. The recommended values of C6 and R8 are 1 uf and 100K ohms, respectively. The output of NAND gate IC1C and NAND gate IC1B are coupled to first and second inputs, respectively, of NAND gate IC1D (type 4093).

In operation, as the input to the oscillating circuit at terminal 36 switches to logical 1, capacitor C4 charges according to the R5C4 time constant, causing C5 to simultaneously charge in accord with its R6C5 time constant. Capacitor C4 charges from approximately 2 volts to 6 volts in about 170 msec. During that time the first input to NAND gate IC1B oscillates from between positive 2 to positive 5 volts. As a result, the NAND gate IC1B emits at its output a varied square wave. Simultaneously, the output of XOR gate IC2B emits a positive pulse at terminal 38. The positive pulse is coupled to the second input of NAND gate IC1B and the first input to NAND gate IC1C. The output of NAND gate IC1C is caused to emit a square wave having a 100 ms duration. At least once during the 650 msec period in which the outputs of NAND gates IC1B and IC1C are emitting the square wave forms, the output of IC1B is low while the output of IC1C switches high. This combination causes the output of NAND gate IC1D to rise to logical 1 during the period in which the output of IC1B is low and the output of IC1C is high. This positive pulse causes the transistor T3 to turn on and hence cause the speaker 40 to emit an audible sound and the LED D2 to turn on.

As the dark object continues to pass through the fields of radiation, and eventually leaves the field 14, capacitor C4 is caused to discharge over a 650 msec period. As a result, NAND gate IC1B is caused to oscillate for a longer period of time. The NAND gate IC1D thus causes transistor T3 to turn on and off a plurality of times, resulting in a plurality of audible sounds.

In its preferred form, the invention will emit at least one sound when a dark object enters the light background of the field of radiation 14, and will emit at least a plurality of sounds as the dark object leaves the field 14. The invention functions similarly when a light object is passed through a dark background in the fields of radiation.

While the invention has been particularly shown and described with reference to preferred embodiments thereof, it will be understood by those skilled in the art that the foregoing and other changes in form and details may be made therein without departing from the spirit and scope of the invention. For example, it may be desirable to integrate the pick up 32 (or 34) as part of the optical sensor 10 (or 12). Additionally, while reference is made to the transistor T1 having higher a gain than the transistor T2, it should be evident that the circuit permits operation to be achieved using a transistor T2 which would have a higher gain than the transistor T1. However, it is most desirable to have the transistor T1 and T2 substantially matched to each other.

What is claimed is:

1. An optical sensing circuit generating audible signals in response to variations in light within first and second fields of radiation, comprising in combination:
   (a) a first phototransistor having an emitter, a light responsive base, and a collector;
   (b) first means for coupling the emitter of said first phototransistor to ground potential;
   (c) a second phototransistor having an emitter, a light responsive base, and a collector;
   (d) second means for coupling the collector of said second phototransistor to a supply voltage;
   (e) third means for coupling the collector of said first phototransistor with the emitter of said second phototransistor at a summing junction to produce a junction voltage;
   (f) means for coupling light in said first field of radiation to said first phototransistor and coupling light in said second field of radiation to said second phototransistor;
   (g) said junction voltage generally assuming one of two output voltage levels corresponding to one of two logic states, said junction voltage assuming a first output voltage level relatively near ground potential corresponding to a first of said logic states when said first phototransistor receives relatively more light than said second phototransistor, said junction voltage assuming a second output voltage level relatively near the supply voltage corresponding to a second of said logic states when said first phototransistor receives relatively less light than said second phototransistor;
   (h) trigger pulse means coupled to said summing junction and responsive to transitions of the junction voltage between the first and second logic states for generating a trigger pulse in response to such transitions;
   (i) audio generator means coupled to said trigger pulse means and responsive to said trigger pulse for generating audio signals for a predetermined duration; and
   (j) a speaker coupled to said audio generator means for providing audible signals in response to said audio signals.

2. An optical sensing circuit as recited by claim 1 wherein the first and second fields are different from one another.

3. An optical sensing circuit as recited by claim 1 wherein said first and second photoconductive transistors are optically coupled with the eyes of a toy doll.

4. An optical sensing circuit as recited by claim 1 wherein said first and second photoconductive transistors are positioned in the eyes of a toy doll.

5. An optical sensing circuit as recited by claim 1 wherein said oscillating means includes:
   (a) a first oscillator having an output terminal providing a first square wave;
   (b) a second oscillator having an output terminal providing a second square wave;
   (c) gating means coupled to the output terminals of said first and second oscillators and responsive to said first and second square waves for providing a gated output signal to said speaker means.

6. An optical sensing circuit as recited by claim 5 wherein said first oscillator includes a first R-C network having an R-C time constant, and wherein said trigger pulse means provides an output signal to said first R-C network to vary the square wave produced by said first oscillator.

7. An optical sensing circuit as recited by claim 6 wherein said first oscillator includes a second R-C network having a second R-C time constant, said second R-C network being coupled to said first R-C network for being charged or discharged thereby.

8. A toy having a body and generating audible signals in response to variations in light received by first and second portions thereof, comprising in combination;
   (a) a first phototransistor having an emitter, a light responsive base, and a collector;
   (b) first means for coupling the emitter of said first phototransistor to ground potential;

(c) a second phototransistor having an emitter, a light responsive base, and a collector;

(d) second means for coupling the collector of said second phototransistor to a supply voltage;

(e) third means for coupling the collector of said first phototransistor with the emitter of said second phototransistor at a summing junction to produce a junction voltage;

(f) said first and second phototransistors receiving light from first and second fields of radiation, respectively;

(g) said junction voltage generally assuming one of two output voltage levels corresponding to one of two logic states, said junction voltage assuming a first output voltage level relatively near ground potential corresponding to a first of said logic states when said first phototransistor receives relatively more light than said second phototransistor, said junction voltage assuming a second output voltage level relatively near the supply voltage corresponding to a second of said logic states when said first phototransistor receives relatively less light than said second phototransistor;

(h) trigger pulse means coupled to said summing junction and responsive to transitions of the junction voltage between the first and second logic states for generating a trigger pulse in response to such transitions;

(i) audio generator means coupled to said trigger pulse means and responsive to said trigger pulse for generating audio signals for a predetermined duration; and (j) a speaker coupled to said audio generator means for providing audible signals in response to said audio signals.

9. The toy as recited by claim 8 further comprising:
(a) first light amplifying means for controlling and focusing the light in the first field onto said first phototransistor; and
(b) second light amplifying means for controlling and focusing the light in the second field onto said second phototransistor.

10. A toy as recited by claim 8 wherein said trigger pulse means includes a Schmitt-trigger inverter for receiving the summing junction voltage.

11. A toy as recited by claim 8 wherein said toy is a doll and wherein said first and second phototransistors are positioned in the eyes of the doll.

12. A toy as recited by claim 3 wherein said audio generator means includes:
(a) a first oscillator having an output terminal for providing a first square wave in response to said trigger pulse;
(b) a second oscillator having an output terminal for providing a second square wave in response to said trigger pulse; and
(c) gating means coupled to the output terminals of said first and second oscillators and responsive to said first and second square waves for providing a gated output signal to said speaker.

13. A toy as recited by claim 12 wherein said first oscillator includes a first R-C network having an R-C time constant, and wherein said trigger pulse means provides an output signal to said first R-C network to vary the square wave produced by said first oscillator.

14. A toy as recited by claim 13 wherein said first oscillator includes a second R-C network having a second R-C time constant, said second R-C network being coupled to said first R-C network for being charged or discharged thereby.

15. A toy having a body and generating audible signals in response to variations in light impinging on said body, comprising in combination:
(a) optical sensor means communicating with the body of said toy for creating a voltage responsive to light received by said optical sensor means;
(b) a Schmitt-trigger circuit having at least one input coupled to said optical sensor means for receiving the light responsive voltage and having an output for providing a binary output signal having first and second logic states;
(c) trigger pulse means coupled to the output of said Schmitt-trigger circuit for detecting transitions in the binary output signal provided thereby and generating a trigger pulse of predetermined duration in response thereto;
(d) audio generator means coupled to said trigger pulse means and responsive to said trigger pulse for generating audio signals; and
(e) a speaker coupled to said audio generator means for providing audible signals in response to said audio signals.

16. A toy as recited by claim 15 wherein said trigger pulse means includes a diode, a resistor, and a capacitor, said resistor and capacitor being interconnected at a common node to cause said common node to discharge at an associated RC time constant, said diode being connected to said common node and coupled to the output of said Schmitt-trigger circuit for charging said common node in response to a transition of said binary output signal, said trigger pulse being derived from said common node.

17. A toy as recited by claim 16 wherein said trigger pulse means includes a transition detector coupled between the output of said Schmitt-trigger circuit and said diode for creating a positive pulse of relatively short duration each time the binary output signal of said Schmitt-trigger circuit switches between the first and second logic states, said positive pulse created by said transition detector causing said diode to charge said common node for subsequent discharge by said resistor and capacitor.

18. A toy as recited by claim 17 wherein said transition detector includes an exclusive-OR logic gate having first and second inputs, the first input of said exclusive-OR gate being directly coupled to said Schmitt-trigger circuit output, the second input of said exclusive-OR gate being coupled through a resistor to said Schmitt-trigger circuit output and to a charging capacitor for receiving said binary output signal delayed by a relatively short period corresponding to the relatively short duration of the positive pulse created by said transition detector.

19. A toy including optical sensor means for triggering the generation of lifelike sounds from the toy, comprising in combination:
(a) optical sensor means disposed within said toy and receiving light for generating an electrical signal in response thereto, said signal having first and second logic states;
(b) trigger pulse means coupled to said optical sensor means and responsive to changes in said signal between said first and second logic states for providing a trigger pulse;
(c) a first oscillator coupled to said trigger pulse means and having an input for receiving said trigger pulse, said first oscillator having an output for providing a first oscillating signal in response to the receipt of the trigger pulse;

(d) a second oscillator coupled to said trigger pulse means and having an input for receiving said trigger pulse, said second oscillator having an output for providing a second oscillating signal in response to the receipt of the trigger pulse;

(e) a logic gate having first and second input terminals, said first input terminal being coupled to the output of said first oscillator for receiving said first oscillating signal, said second input terminal being coupled to the output of said second oscillator for receiving said second oscillating signal, said logic gate having an output terminal providing a gated output signal corresponding to said second oscillating signal gated by said first oscillating signal; and (f) a speaker mounted within said toy and coupled to the output terminal of said logic gate and responsive to the gated output signal for providing said lifelike sounds.

20. A toy as recited by claim 19 wherein said trigger pulse means includes a Schmitt-trigger circuit having an input coupled to said optical sensor means for receiving said light responsive electrical signal therefrom, said Schmitt-trigger circuit including an output for providing a binary output signal having first and second logic states, the binary output signal being responsive to said light responsive electrical signal, said trigger pulse means being responsive to transitions in the binary output signal provided by said Schmitt-trigger circuit for providing said trigger pulse.

21. A toy as recited by claim 20 wherein said second oscillator further includes a control terminal for receiving a control voltage, said second oscillator being responsive to said control voltage for varying said second oscillating signal, and wherein the output of said Schmitt-trigger circuit is coupled to said control terminal for providing said control voltage thereto.

22. A toy as recited by claim 20 wherein said first and second oscillators each comprise an inverting logic gate having first and second inputs and an output, the first input of each of said inverting logic gates being coupled in common to said trigger pulse means for receiving said trigger pulse signal, the second input of each of said inverting logic gates being coupled through a feedback resistor to the respective output thereof, the second input of each of said inverting logic gates being further coupled through an associated capacitor to a fixed referenced voltage, said second oscillator further including an RC network having an input control terminal and an output control terminal, the input control terminal being coupled to the output of said Schmitt-trigger circuit, and the output control terminal being coupled to the second input of said inverting logic gate of said second oscillator for varying said second oscillating signal in accordance with the binary output state of said Schmitt-trigger circuit.

23. A toy generating audible sounds in response to particular variations of light received by at least two portions of said toy, comprising in combination:

(a) optical sensor means having first and second light sensors positioned at first and second locations within said toy for viewing first and second light fields, said optical sensor means including an output terminal for providing an output signal having first and second output states, the output signal assuming a first output state when said first light sensor receives relatively more light than said second light sensor, the output signal assuming a second output state when said second light sensor receives relatively more light than said first light sensor;

(b) trigger pulse means coupled to said output terminal of said optical sensor means and responsive to transitions of the output signal between the first and second output states for generating a trigger pulse in response to such transitions;

(c) audio generator means coupled to said trigger pulse means and responsive to said trigger pulse for generating audio signals for a predetermined duration; and (d) a speaker coupled to said audio generator means for providing audible signals in response to said audio signals.

24. A toy as recited by claim 23 further including a Schmitt-trigger circuit for coupling said optical sensor means to said trigger pulse means, said Schmitt-trigger circuit having an input coupled to the output terminal of said optical sensor means and an output terminal coupled to said trigger pulse means.

25. A toy doll as recited by claim 23 wherein said first and second light fields are separate from one another.

* * * * *